United States Patent [19]

Haschke et al.

[11] 3,956,121

[45] May 11, 1976

[54] PROCESS FOR THE PRECIPITATION OF HEAVY METAL ION-POLYCARBOXYLATE COMPLEXES

[75] Inventors: Heinz Haschke, Grossauheim; Helmut Knorre, Seligenstadt; Gerhard Morlock; Gerhard Pohl, both of Grossauheim, all of Germany

[73] Assignee: Deutsche Gold- und Silber-Scheideanstalt vormals Roessler, Frankfurt am Main, Germany

[22] Filed: Nov. 11, 1974

[21] Appl. No.: 522,799

[30] Foreign Application Priority Data
Nov. 15, 1973 Germany................ 2356963

[52] U.S. Cl................................. 210/53; 134/13; 210/58; 210/DIG. 25
[51] Int. Cl.².......................................... C02B 1/20
[58] Field of Search ................ 134/13; 75/108, 109; 210/28, 42, 43, 51–54, 58–60, DIG. 25; 252/180; 260/2.2 C, DIG. 4; 204/105 R

[56] References Cited
UNITED STATES PATENTS

| 3,033,214 | 5/1962 | Bersworth et al..................... 134/13 |
| 3,409,415 | 11/1968 | Moore ............................ 75/101 BE |
| 3,682,701 | 8/1972 | Lancy................................. 210/60 |
| 3,686,145 | 8/1972 | Haschke et al..................... 252/180 |

*Primary Examiner*—Charles N. Hart
*Assistant Examiner*—Peter A. Hruskoci
*Attorney, Agent, or Firm*—Beveridge, Degrandi, Kline & Lunsford

[57] ABSTRACT

A process for precipitating heavy metal ion-polycarboxylate complexes from solution, said process comprising adding to a solution containing at least one of said complexes an aqueous solution of a water soluble aluminum salt, the anion of which does not form any water soluble complexes with said heavy metal ions to be precipitated or optionally such anion-heavy metal complexes having a stability constant, expressed as their decadic logarithm, of less than 2; wherein 0.9 to 1.8 moles of aluminum ions are employed per equivalent of polycarboxylate; and adjusting the pH of the resulting reaction mixture to about 6.5 to about 9.0 with an alkali metal carbonate.

16 Claims, No Drawings

PROCESS FOR THE PRECIPITATION OF HEAVY METAL ION-POLYCARBOXYLATE COMPLEXES

Effluents from the metal processing industry must normally be reprocessed before they can be discharged into canals or other bodies of water. Expecially, hexavalent chrome must be reduced to the trivalent state, cyanogen compounds must be destroyed (oxidatively), fluoride ions and heavy metal ions must be precipitated, and the effluent must be neutralized. For the residual concentration of heavy metal ions in effluents, at present the following border values are prescribed by the authorities:

| Metal | Legally prescribed border values in mg Me/l | | | |
|---|---|---|---|---|
| | Fed. Rep. of Germany* | | Switzerland* | |
| | a | b | a | b |
| Cu | 3.0 | 0.5 | 0.1 | 0.1 |
| Zn | 5.0 | 3.0 | 2.0 | 2.0 |
| Ni | 5.0 | 1.0 | 2.0 | 2.0 |
| Cd | — | 3.0 | 1.0 | 1.0 |
| Fe | insofar as the clarification plant permits | 3.0 | insofar as the clarification plant permits | 3.0 |
| Cr | 4.0 | 2.0 | 2.0 | 2.0 |
| Pb | — | — | 1.0 | 1.0 |
| Hg | — | — | 0.1 | 0.1 |
| Permissible pH range | 6.5–9.5 | 6.5–9.0 | 6.5–9.0 | 6.5–8.5 |

*Fed. Rep. of Germany: Standard values for sewage cleaning processes LAWA 1970 (Galvanotechnik 62 [1971], 1076)
*Switzerland: Confederate guidelines of September 1, 1966.

a. in case of discharging into canals with connection to a mechanical-biological sewage plant
b. in case of discharging into receiving water.

Although it is known in the art that it is possible in principle to precipitate heavy metal ions from aqueous solutions free of complexing agents with the help of bases in the presence of occlusion agents, such as aluminum salts (G. Schwarzenbach, *General and Inorganic Chemistry*, G. Thieme Publishers, Stuttgart, 4th Edition 1950, p. 334), or in the presence of so-called collectors, such as aluminum phosphate or strontium phosphate, (H. H. Schulte-Schrepping and A. Deike, Galvanotechnik 63 [1972], No. 7, 641), the precipitation of the heavy metal ions does cause considerable difficulties anyway, especially when different metal ions are simultaneously present or in case of a high concentration of neutral salts. However, it is made even more difficult or even prevented completely whenever inorganic or organic complexing agents are contained in the effluent, which are not destroyed in the customary decontamination processes [H. Schlegel, Complex Heavy Metal Compounds In Effluents, Galvanotechnik 63 (1972), No. 6, p. 514; H. H. Daester and M. Jola; Concerning the Precipitation of Heavy Metals and Observance of Legally Prescribed Border Values for Sewage, Galvanotechnik 63 (1972), No. 12, p. 1117]. Because of the complexing, the free concentration of heavy metal ions is reduced so greatly that the solubility product of the metal hydroxide is no longer exceeded. The necessary consequence is that under these conditions, the residual concentrations of metal ions in the sewage are too high, and the presently valid minimum requirements are no longer fulfilled. It is, therefore, of decisive importance for the employability of a complexing agent in the metal processing industry, especially in galvanizing processes, that its heavy metal ion complexes can be removed quantitatively in practice from the effluents.

Among the known complexing agents there is a group which is particularly compatible with the environment because its representatives contain no phosphorus, sulfur or nitrogen, and consequently contribute nothing to the eutrophization of the waters. These complexing agents are known as polycarboxylates, i.e., such polymer electrolytes which have a multiplicity of carboxyl or carboxylate groups as functional groups.

This invention provides a process for the precipitation of heavy metal ion-polycarboxylate complexes from their aqueous solutions. The process comprises first adding an aqueous solution of a water soluble aluminum salt, the anion of which does not form water soluble complexes with the metal ions to be precpitated or possibly such anion-heavy metal complexes having a stability constant of less than 2, expressed as its decadic (decimal) logarithm, to a solution containing the heavy metal ion-polycarboxylate complexes in such an amount that about 0.9 to 1.8 moles of aluminum ions are provided for each equivalent of the polycarboxylate. Subsequently, the pH is adjusted to about 6.5 to about 9.0.

Surprisingly, both the complexing agents as well as the heavy metal ions are practically precipitated quantitatively by the process of this invention. By the addition of the aluminum salt solution, the polycarboxylate-heavy metal ion-complexes are "re-complexed" to aluminum complexes, which are difficult to dissolve in a certain pH range. At the same time, the heavy metal ions liberated from the original complexes are precipitated as hydroxides or carbonates which are difficult to solubilize. The amorphous, voluminous aluminum complex possibly increases at the same time the quantitative separation of the heavy metal ions by producing an occluding effect.

The process according to this invention is suitable particularly for the precipitation of the polycarboxylate complexes of all heavy metal ions being used in the art of galvanizing. Examples of such heavy metal ions are the ions of zinc, cadmium, copper, nickel, cobalt, iron and chrome. The process of the invention is suitable particularly for the precipitation of zinc, cadmium, copper, nickel and chromium ions from solutions of their polycarboxylate complexes.

The process according to this invention can be used basically for the precipitation of the heavy metal complexes of all complexing agents of the type of the polycarboxylates. Examples of such complexing agents are polyacrylates, poly (α-hydroxyacrylates), homo- or copolymerizates of maleic acid or of other unsaturated di- and polycarboxylic acids, e.g., itaconic acid, or the corresponding salts.

The process of this invention is employed at a special advantage for the precipitation of the heavy metal ion complexes of such polycarboxylates which contain not only carbonyl and/or hydroxyl groups, but also an overwhelming number of carboxyl or carboxylate groups as functional groups. These polycarboxylates, depending on which of the mentioned groups they contain and in what proportion, are called poly (aldehydocarboxylates) — for short PAC —, poly (hydroxycarboxylates) — for short POC —, or poly (hydroxyaldehydocarboxylates) — for short PAC or POC — depending on their preponderant character. The mean degree of polymerization of the most important representatives lies between about 5 and 500, preferably between about 10 and about 300, especially between about 15 and about 100. At the same time the data concerning the mean degree of polymerization are to be understood in such a way that their values of 5, 10, 15, 100, 300 or 500 correspond to values of the reduced viscosity, measured on 1 % solutions of free poly (aldehydocarboxylic acids), or for the poly (hydroxycarboxylates) and poly (hydroxyaldehydocarboxylates), measured on the poly(aldehydocarboxylic acids) forming the base of the former as intermediate products, of 0.033, 0.047, 0.053, 0.095, 0.200 or 0.300 deciliter per gram, whereby for the preparation of the 1 % poly (aldehydocarboxylic acid) solutions needed for the measurement, corresponding quantities of 5 % aqueous $SO_2$ solutions are poured first over the free poly (aldehydocarboxylic acids) and in that after complete solution has occurred, this is filled up with the same volume of 10 % aqueous NaCl solutions. The viscosity measurement is carried out at 20°C.

These polycarboxylates are built up from:

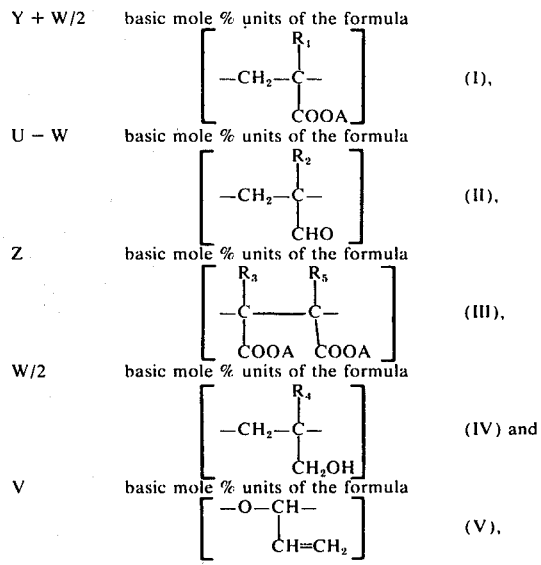

wherein U equals about 12 to about 47, preferably about 10 to about 30; V equals about 1 to about 25, preferably about 1 to about 15, especially about 1 to about 10; W equals about 0 to about U, preferably about 0.3 . U to about U, especially about 0.5 . U to about U; Y equals 100- (U + V + Z) and Z equals 0 to about 20, preferably 0 to about 10, especially 0; A signifies an alkali metal, hydrogen or ammonium ion, preferably a sodium or hydrogen ion; $R_1$ signifies hydrogen, methyl, hydroxymethyl, ethyl, chlorine or bromine, preferably hydrogen or hydroxymethyl; $R_2$ and $R_4$ are the same or different and signify hydrogen or hydroxymethyl; $R_3$ and $R_5$ are the same or different and signify hydrogen, methyl or ethyl, preferably hydrogen; and wherein it must be fulfilled as a boundary condition that for W greater than 0.3 . U, therefore for polymers which contain a noticeable number of units of the general formula (IV), the quotient of basic mole % carboxyl or carboxylate groups to basic mole % hydroxyl groups lies between 2 and 16, preferably between about 2 and about 9, especially between about 3 and about 8.

The portions of the units with the general formulas (I) to (V) are given in basic mole % according to E. Trommsdorff, i.e., as the mean number of the pertinent units of formulas per altogether 100 formula units (I) to (V) in the polymer molecules.

The previously defined poly (aldehydocarboxylates), poly (hydroxycarboxylates) and poly (hydroxyaldehydocarboxylates) as well as suitable processes for their production, are described in detail in German applications 1,904,940, 1,904,941 and 1,942,556, opened to public inspection. Among other things they are eminently suited as complexing agents in cleaning, degreasing and rust prevention agents for the metal industry. In electrolytic baths, e.g., for copper, nickel, silver, gold and other metals, they can aid in the elimination of disturbing traces of foreign metals or for shifting of deposition potentials.

Aqueous solutions of all water soluble aluminum salts can be employed as precipitants, the anion of which does not form water soluble complexes with the metal ions to be precipitated. Optionally, one can employ water soluble aluminum salts, the anion of which forms complexes with the heavy metal ions to be precipitated, provided that the anion-heavy metal complex has a stability constant, expressed as its decadic (decimal) logarithm, of less than 2. Examples of such aluminum salts are aluminum chloride, e.g., $AlCl_3 . 6 H_2O$; aluminum sulfate, e.g., $Al_2(SO_4)_3 . 18 H_2O$; aluminum nitrate, e.g, $Al(NO_3)_3 . 9 H_2O$, and aluminum acetate, e.g, $Al(CH_3COO)_3$. Preferably, solutions of aluminum salts of inorganic acids are employed. Besides the solutions of the complete salts, those of corresponding bases are also suitable. Thus, particularly good results will be obtained in case of use of a solution of a basic aluminum chloride of the composition $Al(OH)_xCl_{3-x}$, obtainable commercially for which to be sure the value of x is surely and clearly larger than zero and clearly smaller than 3, but is not known precisely. Such basic aluminum chlorides can be characterized more clearly by the fact that a solution with an aluminum content corresponding to 15% by weight of $Al_2O_3$ consumes 0.436 equivalents $OH^-$ / 100 ml = 0.43 equivalents OH / 100 g when titrated with an alkali metal hydroxide solution against phenolphthalein.

It will be effective to use aluminum salt solutions in which the concentration of aluminum ions is not smaller than required, in order to bring about a dilution of the metal-complex-salt solution by a maximum of 10% by volume by the addition of this solution according to the process of this invention; typically one uses a concentration of aluminum ions of about 0.2 – 4 moles Al/liter. It is furthermore recommended to add the aluminum salt solution slowly to the solution of the complex to be treated, and to stir the latter vigorously during the addition.

The quantity of aluminum salt solution to be added is adjusted always according to the total polycarboxylate content of the complex-solution to be treated. Whenever the polycarboxylate is present in excess relative to the complexed heavy metal ions, which will be the case generally, then it will therefore not be sufficient to add merely a quantity of aluminum ions corresponding to the complexed heavy metal ions. Rather, it will be necessary to precipitate the entire polycarboxylate as a difficulty soluble aluminum complex. For this purpose 0.9 to 1.8 moles, preferably about 1.0 to about 1.5 moles, especially about 1.1 to about 1.3 moles of aluminum ions per equivalent of the polycarboxylate are required. At the same time the quantity by weight in grams, which can be calculated from the mean chemical formula of the polycarboxylate and its mean molecular weight per 100 basic mole % formula units for one mole of carboxyl or carboxylate groups, is considered as an equivalent of the polycarboxylate. In the case of the poly (aldehydocarboxylates), poly(hydroxycarboxylates) and poly(hydroxyaldehydocarboxylates) the mean chemical formula can be deduced from the formula units (I) to (V) and their relative portions given by the parameters Y, U, V, W and Z.

After concluding the addition of the aluminum salt solution, the pH value of the reaction mixture must be adjusted with an alkali metal carbonate, e.g., sodium or potassium carbonate, to about 6.5 to about 9.0, preferably about 7.0 to about 8.9, especially about 7.3 to about 8.7. It will be effective to add the alkali metal carbonate too in the form of an aqeuous solution while stirring. Suitable solutions are especially 0.1 molar to saturated ones. Preferably sodium carbonate solutions are used.

It is essential for the process according to this invention, that first the aluminum salt solution is added and then the pH is adjusted. If this sequence is reversed, then the danger exists that colloidal deposits will form, which make further processing more difficult or completely impossible.

With the process according to this invention, even at very small ion concentrations down to about 0.1m mole metal/l, a perfect, practically complete separation of the heavy metal ions will be achieved. The process will lead to the success striven for even when there are different heavy metal ions in admixture with one another.

The separation of the resulting precipitate from the treated reaction mixture (e.g., effluent) can be accomplished by sedimentation and decantation or by filtration with the help of suitable filters, for example with pressure filters.

The process of the invention will be explained in more detail by the succeeding Examples. The following polycarboxylates form the basis of the heavy metal ion-complexes to be precipitated in these Examples. All parts, proportions, percentages and ratios are by weight unless otherwise indicated.

Polycarboxylate A

A poly (aldehydocarboxylic acid) solution was produced by oxidative copolymerization of 20 mole % acrylic acid with 80 mole % acrolein in aqueous, 20% by weight hydrogen peroxide at 70°C (1.1 mole acrolein per mole $H_2O_2$; dosing-in of the monomer mix to the stirred hydrogen peroxide solution with 4 hours). This solution, after separation by distillation of the larger part of residual monomers, was neutralized by dosing-in of 40% by weight of caustic soda solution at 35°C, and was subjected by further addition of NaOH up to pH 12 to the Cannizzaro reaction. After neutralization of the alkaline reaction mixture with a residue of the above mentioned poly (aldehydocarboxylic acid) to pH 7, a 36% by weight aqueous solution of a poly (hydroxycarboxylate) was obtained, which is characterized by the following parameters: Y = 70 basic mole %, U = 17 basic mole % V = 13 basic mole %, W = 16 basic mole %, Z = 0 basic mole % with a mean degree of polymerization (mean viscosity) of $\overline{P}$ = 20. From these data an equivalent weight of the POCNa salt (with due consideration of the degree of neutralization, as present in case of the adjustment to pH 7, of 0.88 and with due consideration of analytically determinable terminal groups) of: 109.0 results.

Polycarboxylate B

A poly(aldehydocarboxylic acid) solution was produced by oxidative copolymerization of 50 mole % acrylic acid with 50 mole % acrolein in aqueous, 20% by weight hydrogen peroxide at 70°C (1.1 mole acrolein per mole $H_2O_2$; dosing-in of the monomer mix to the stirred hydrogen peroxide solution within 4 hours). This solution, after separation by distillation of the larger part of residual monomers, was neutralized by dosing-in of 45% by weight caustic soda solution at 35°C, and was subjected to the Cannizzaro reaction by additional addition of NaOH to a pH of 12. After neutralization of the alkaline reaction mixture with a residue of the above mentioned poly (aldehydocarboxylic acid) to a pH of 7, a 38% by weight aqueous solution of a poly (hydroxycarboxylate) was obtained, which can be described by the following parameters: Y = 78 basic mole %, U= 16 basic mole %, V = 6 basic mole %, W = 15 basic mole %, Z = 0 basic mole %, with a mean degree of polymerization (mean viscosity) of $\overline{P}$ = 60. From these data an equivalent weight (with due consideration of the degree of neutralization as it exists in case of the adjustment to pH 7, of 0.88 and with due consideration of the analytically determinable terminal groups) of:101.5 results.

Polycarboxylate C

A poly (aldehydocarboxylic acid) solution corresponding precisely to the first step of the production process for polycarboxylate B was produced by oxidative copolymerization of 50 mole % acrylic acid with 50 mole % acrolein. This solution was neutralized subsequently as stated in the production of the polycarboxylate B with a 45% by weight caustic soda solution. It was reacted according to Cannizzaro. The only difference was that the entire neutralization and Cannizzaro reactions were carried out in the presence of 1.5 mole formaldehyde (added as a 40% formalin solution) per mole aldehyde groups in the poly (aldehydocarboxylic acid) solution. The poly(hydroxycarboxylate), accumulated as a 34% by weight, aqueous solution, obtained after the neutralization of the alkaline reaction mixture with a residue of poly(aldehydocarboxylic acid) solution to pH 7, can be described by the following parameters: Y = 78 basic mole %, V = 16 basic mole %, W = 13 basic mole %, Z = 0 basic mole %, with a mean degree of polymerization (mean viscosity) of $\overline{P}$ = 60. The structure of this poly(hydroxycarboxylate) corresponded to the following simplified, approximate formula, not taking into consideration the sequences of formula units (that are to be assumed statistically):

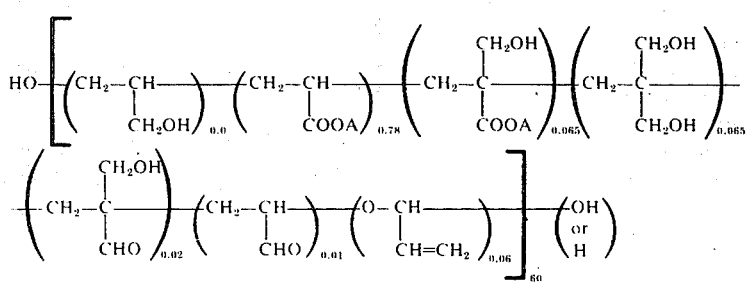

whereby A signifies Na or H, i.e., corresponding to the apparent dissociation constant of this poly(hydroxycarboxylic acid) compound [or of the fundamental free poly(hydroxycarboxylic acid)] and corresponding to the pH adjustment of the poly(hydroxycarboxylate) solution to pH7, A signifies 0.88 Na-ions per 0.12 H-ions. The equivalent weight of this compound, with due consideration of the degree of neutralization of 0.88 and with due consideration of the analytically determinable terminal groups therefore, is: 107.6.

EXAMPLE 1

4 ml of a commercial solution of a basic aluminum chloride having an aluminum content of 3 moles $Al^{+++}$/liter were added while stirring within 10 minutes to 200 ml of an aqueous solution, which contained 2 m mole of zinc ions as zinc sulfate in a complex solution with 10 milliequivalents of the polycarboxylate B. Subsequently the pH value of the solution was adjusted to 7.5 by the addition of a 10% soda solution. After a stirring time of 15 minutes the precipitate formed was filtered off through a folded filter, and the residual content of zinc ions in the filtrate was determined analytically. When dithizone was used as a detecting reagent, no zinc was detected; i.e. the zinc concentration was way below the border values under the law for discharge of effluent into the receiving water permitted.

By comparison no precipitate of metal was observed at all when the process was conducted without addition of aluminum.

In another comparative example the pH value was adjusted to 4 after addition of the aluminum salt solution. At the same time it is true, precipitation occurred, but the filtrate still contained about 475 mg zinc/liter.

In another comparative example, after addition of the aluminum salt solution the pH value was adjusted with caustic soda solution to 7.5 . In this case again precipitation was achieved but the filtrate still contained 22.5 mg zinc per liter.

In still another comparative example the pH value of the solution was adjusted with soda solution to 10.0 after addition of the aluminum salt solution; in this case, almost the entire quantity of the prepared metal ions could still be found analytically in the filtrate (537 ppm of zinc).

EXAMPLE 2

20 ml of an aqueous aluminum chloride solution having an aluminum content of 0.6 mole $Al^{+++}$/liter were added within 10 minutes while stirring to 200 ml of an aqueous solution which contained 2 m mole cadmiun ions as cadmium sulfate in a complex solution with 10 milliequivalents of polycarboxylate B. The pH value of the solution was subsequently adjusted to 8.5 by addition of a 10% soda solution. After 15 minutes of stirring, the precipitate formed was filtered off through a folded filter, and the residual content of cadmium ions was determined nephelometrically as cadmium sulfide. In evaluating the analysis on the basis of a calibration plot, a residual content of 1.5 mg cadmium per liter of filtrate resulted.

By comparison, a solution of the same concentration of a cadmium complex was adjusted in a second experiment after addition of the aluminum chloride to pH 6.5. In this case too, a precipitate was formed which could be separated by means of a folded filter. Only 1 mg of cadmium per liter was found still in the filtrate of this experiment.

In another variation of the experiment and in case of an analogous solution, the pH value was adjusted to 4. In this case, only a partial precipitation was achieved; the filtrate still contained 115 mg Cd/liter.

EXAMPLE 3

4 or 6 or 8 ml of a commercial solution of a basic aluminum chloride having an aluminum content of 3 mole $Al^{+++}$/liter were added within 10 minutes while stirring to 200 ml of an aqueous solution containing 2 m mole copper ions as copper chloride and 20 milliequivalents of polycarboxylate C. Subsequently, the pH value of the solution was adjusted to 7.5 by addition of a 10% soda solution. After a stirring time of 15 minutes always the precipitate formed was filtered off by means of a folded filter and the residual content of copper ions in the form of copper sulfide was determined nephelometrically in the filtrate. In case of the various quantities of aluminum salt solution, the following residual concentrations of copper were found in the filtrate: in case of addition of 0.6 m mole $Al^{+++}$/milliequivalent POC: about 24 mg Cu/liter filtrate; in case of 0.9 m mole $Al^{+++}$/milliequivalent POC: about 0.6 mg Cu/liter filtrate; in case of 1.2 m mole $Al^{+++}$/milliequivalent POC: 0 mg Cu/liter filtrate.

EXAMPLE 4

4 ml of a commercial solution of a basic aluminum chloride having an aluminum content of 3 mole $Al^{+++}$/liter were added within 10 minutes while stirring to 200 ml of an aqueous solution containing 2 m mole nickel ions as nickel chloride, in a complex solution with 10 milliequivalents of polycarboxylate A. Subsequently, the pH value of the solution was adjusted to 7.0 or 7.5 or 8.0 or 8.5 or 9.0, respectively, by addition of a 10% soda solution. After a stirring time of 15 minutes always the precipitate formed was filtered off through a folded filter, and the residual content of nickel ions in the filtrate was determined analytically with diacetyldioxime. In case of the precipitates in the pH range of 7.5 to 9.0, no nickel was found in the filtrate.

EXAMPLE 5

20 ml of an aqueous aluminum chloride solution with an aluminum content of 0.3 mole $Al^{+++}$/liter were added within 10 minutes while stirring to 500 ml of an aqueous solution having 0.5 or 0.25 or 0.05 m mole chrome ions as chromium chloride in a complex solution with 10 milliequivalents of polycarboxylate B, and subsequently the pH value of the solution was adjusted to 7.5 by addition of a 10% soda solution. After a stirring time of 15 minutes, the precipitate formed was filtered off through a folded filter and the residual content of chromium ions in the filtrate was determined colorimetrically with diphenyl carbazide. No residual content of chromium was found in any filtrate of the various concentrated chromium complex salt solutions after the precipitation.

In a comparative experiment a pH value of 4 was adjusted after addition of the aluminum salt solution. In this case, to be sure, a precipitation also took place, but the filtrate still contained between 70 and 332 mg Cr/liter.

EXAMPLE 6

15 ml. of a commercial solution of a basic aluminum chloride having an aluminum content of 3 mole $Al^{+++}$/liter were added within 10 minutes while stirring to 500 ml of an aqueous solution always with 0.5 m mole zinc, cadmium, copper, nickel and chrome ions, in the form of metal chlorides and altogether 50 milliequivalents of polycarboxylate B. Subsequently, the pH value of the solution was adjusted to 7.5 by addition of a 10% soda solution. After a stirring time of 15 minutes, the precipitate formed was filtered off through a folded filter, and the residual content of metal ions in the filtrate was determined analytically. In case of all metal ions, the residual content of metal ions was below 1 ppm.

What is claimed is:

1. A process for precipitating heavy metal ion-polycarboxylate complexes from an aqueous metal processing effluent said process comprising adding to said aqueous effluent containing at least one of said complexes an aqueous solution of a water soluble aluminum salt, wherein the anion of said salt does not form any water soluble complexes with said heavy metal ions to be precipitated or does form such anion-heavy metal complexes having a stability constant, expressed as their decadic logarithm, of less than 2; wherein the aluminum salt is added in an amount corresponding to 0.9 to 1.8 moles of aluminum ions per equivalent of polycarboxylate; adjusting the pH of the resulting reaction mixture to about 6.5 to about 9.0 with an alkali metal carbonate; and further wherein said heavy metal ions are selected from the group consisting of zinc, cadmium, copper, nickel, cobalt, iron and chrome; and said polycarboxylate has a mean degree of polymerization of about 5 to about 500, said polycarboxylate being selected from the group consisting of poly(aldehydocarboxylates), poly(hydroxycarboxylates) and poly(hydroxyaldehydocarboxylates); and separating the resulting precipitate from said solution.

2. Process according to claim 1 in which said heavy metal ion is selected from the group consisting of zinc, cadmium, copper, nickel and chromium ions.

3. Process according to claim 1 in which the mean degree of polymerization is about 10 to about 300.

4. Process according to claim 3 in which the mean degree of polymerization is about 15 to about 100.

5. Process according to claim 1 in which the polycarboxylate consists of:

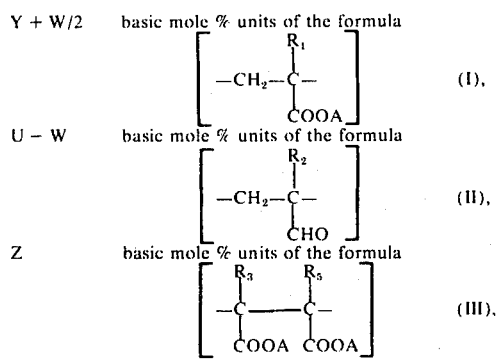

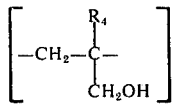

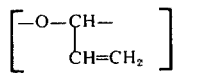

wherein U equals about 12 to about 47; V equals about 1 to about 25; W equals 0 to about U; Y equals 100-(U+V+Z); Z equals 0 to about 20; A signifies an alkali metal, hydrogen or ammonium ion; $R_1$ signifies hydrogen, methyl, hydroxymethyl, ethyl, chlorine or bromime; $R_2$ and $R_4$ are the same or different and signify hydrogen or hydroxymethyl; $R_3$ and $R_5$ are the same or different and signify hydrogen, methyl or ethyl; and whereby when W is greater than 0.3.U, the quotient of basic mole percent carboxyl or carboxylate groups to basic mole percent hydroxyl groups lies between 2 and 16.

6. Process according to claim 5 in which U equals about 10 to about 30; V equals about 1 to about 25; W equals about 0.3.U to about U; A signifies a sodium or hydrogen ion; $R_1$ signifies hydrogen or hydroxymethyl; $R_3$ and $R_5$ are hydrogen; and wherein when W is greater than 0.3 U, the quotient of basic mole percent carboxyl or carboxylate groups to basic mole percent hydroxyl groups lies between about 2 and about 9.

7. Process according to claim 6 in which V equals 1 to about 10; W equals about 0.5.U to about U; Z equals 0; and the quotient is about 3 to about 8.

8. Process according to claim 1 in which said aluminum salt is aluminum chloride, aluminum sulfate, aluminum nitrate or aluminum acetate.

9. Process according to claim 1 in which the aluminum salt is a salt of an inorganic acid.

10. Process according to claim 1 in which the aqueous solution of the water soluble aluminum salt comprises about 0.2-4 moles Al/liter.

11. Process according to claim 1 in which the pH is about 7.0 to about 8.9.

12. Process according to claim 1 in which the pH is about 7.3 to about 8.7.

13. Process according to claim 1 in which the alkali metal carbonate is in an aqueous solution having a concentration of about 0.1 molar to a saturated solution.

14. Process according to claim 13 in which the alkali metal carbonate is sodium carbonate.

15. Process according to claim 1 in which a precipitate is obtained, and the precipitate is separated from the reaction mixture by filtration or sedimentation and decantation.

16. Process according to claim 1 in which said aluminum salt is $Al(OH)_x Cl_{3-x}$, wherein $x$ is larger than zero but less than 3.

* * * * *